United States Patent [19]

Odenwalder

[11] Patent Number: 5,926,500
[45] Date of Patent: Jul. 20, 1999

[54] REDUCED PEAK-TO-AVERAGE TRANSMIT POWER HIGH DATA RATE CDMA WIRELESS COMMUNICATION SYSTEM

[75] Inventor: Joseph P. Odenwalder, Del Mar, Calif.

[73] Assignee: Qualcomm Incorporated, San Diego, Calif.

[21] Appl. No.: 08/660,438

[22] Filed: Jun. 7, 1996

[51] Int. Cl.$^6$ .................................................. H04B 15/00
[52] U.S. Cl. ............................ 375/200; 370/208; 370/209
[58] Field of Search .................................... 370/206, 208, 370/209, 320, 339, 342, 441, 487, 491, 535, 538; 375/200, 206, 208, 267, 265; 380/34; 455/33.1, 54.1

[56] References Cited

U.S. PATENT DOCUMENTS

| | | | |
|---|---|---|---|
| 2,562,180 | 7/1951 | Foley | 312/42 |
| 3,169,171 | 2/1998 | Wachs et al. | 179/185 |
| 3,310,631 | 3/1967 | Brown | 179/15 |

(List continued on next page.)

FOREIGN PATENT DOCUMENTS

| | | | |
|---|---|---|---|
| 0036605 | 9/1981 | European Pat. Off. | H04L 9/02 |
| 0111937 | 6/1984 | European Pat. Off. | H04L 1/00 |
| 0264784 | 4/1988 | European Pat. Off. | H03M 13/12 |
| 0412583 | 3/1991 | European Pat. Off. | H04B 1/56 |
| 0418865 | 3/1991 | European Pat. Off. | H04L 12/56 |
| 0444592 | 9/1991 | European Pat. Off. | H04B 7/212 |
| 7918781 | 12/1979 | United Kingdom | H04Q 7/04 |
| 2125654 | 3/1984 | United Kingdom | H04J 13/00 |
| 2182528 | 10/1986 | United Kingdom | H04J 3/00 |
| 9107030 | 5/1991 | WIPO | H04J 3/06 |

OTHER PUBLICATIONS

"A Spread–Spectrum Technique for High–Capacity Mobile Communications" George R. Cooper et al., *IEEE Transaction on Vehicular Technology*, vol. VT–27, No. 4, Nov. 1978, 12 pages.

"Cellular Land–Mobile Radio: Why spred Spectrum?", George R. Cooper et al., *IEEE Communications Magazine*, Mar. 1979, pp. 278–285.

(List continued on next page.)

*Primary Examiner*—Stephen Chin
*Assistant Examiner*—Joseph Roundtree
*Attorney, Agent, or Firm*—Russell B. Miller; Bruce W. Greenhaus; Tom Streeter

[57] ABSTRACT

A novel and improved method and apparatus for high rate CDMA wireless communication is described. In accordance with one embodiment of the invention, a set of individually gain adjusted subscriber channels are formed via the use of a set of orthogonal subchannel codes having a small number of PN spreading chips per orthogonal waveform period. Data to be transmitted via one of the transmit channels is low code rate error correction encoded and sequence repeated before being modulated with one of the subchannel codes, gain adjusted, and summed with data modulated using the other subchannel codes. The resulting summed data is modulated using a user long code and a pseudorandom spreading code (PN code) and upconverted for transmission. The use of the short orthogonal codes provides interference suppression while still allowing extensive error correction coding and repetition for time diversity to overcome the Raleigh fading commonly experienced in terrestrial wireless systems. In the exemplary embodiment of the invention provided, the set of sub-channel codes are comprised of four Walsh codes, each orthogonal to the remaining set and four chips in duration. The use of four sub-channels is preferred as it allows shorter orthogonal codes to be used, however, the use of a greater number of channels and therefore longer codes is consistent with the invention. In a preferred exemplary embodiment of the invention, pilot data is transmitted via a first one of the transmit channels and power control data transmitted via a second transmit channel. The remaining two transmit channels are used for transmitting non-specified digital data including user data or signaling data, or both. In an exemplary embodiment, one of the two non-specified transmit channels is configured for BPSK modulation and transmission over the quadrature channel.

4 Claims, 9 Drawing Sheets

U.S. PATENT DOCUMENTS

| | | | |
|---|---|---|---|
| 3,715,508 | 2/1973 | Blasbalg | 179/15 |
| 3,795,864 | 3/1974 | Fulton, Jr. | 325/38 |
| 3,959,726 | 5/1976 | Hinoshita et al. | 325/38 |
| 4,002,991 | 1/1977 | Ogita | 328/139 |
| 4,017,798 | 4/1977 | Gordy et al. | 325/38 |
| 4,020,461 | 4/1977 | Adams et al. | 340/146 |
| 4,048,563 | 9/1977 | Osborne | 325/58 |
| 4,052,565 | 10/1977 | Baxter et al. | 179/1.5 |
| 4,092,601 | 5/1978 | Lee et al. | 325/40 |
| 4,100,376 | 7/1978 | Woythaler | 325/65 |
| 4,121,159 | 10/1978 | Lampert | 325/419 |
| 4,152,651 | 5/1979 | Lampert et al. | 179/15 |
| 4,164,628 | 8/1979 | Ward et al. | 179/15 |
| 4,179,658 | 12/1979 | Bitzer | 325/34 |
| 4,188,580 | 2/1980 | Nicolai et al. | 325/32 |
| 4,189,677 | 2/1980 | Cooper et al. | 325/321 |
| 4,193,031 | 3/1980 | Cooper et al. | 455/38 |
| 4,203,070 | 5/1980 | Bowles et al. | 375/1 |
| 4,203,071 | 5/1980 | Bowles et al. | 375/1 |
| 4,217,586 | 8/1980 | McGuffin | 343/100 |
| 4,222,115 | 9/1980 | Cooper et al. | 375/1 |
| 4,247,939 | 1/1981 | Stromswold et al. | 375/1 |
| 4,276,646 | 6/1981 | Haggard et al. | 371/37 |
| 4,287,577 | 9/1981 | Deal, Jr. | 365/233 |
| 4,291,409 | 9/1981 | Weinberg et al. | 375/1 |
| 4,291,410 | 9/1981 | Caples et al. | 375/1 |
| 4,301,530 | 11/1981 | Gutleber | 370/18 |
| 4,308,617 | 12/1981 | German, Jr. | 375/1 |
| 4,309,769 | 1/1982 | Taylor, Jr. | 375/1 |
| 4,313,211 | 1/1982 | Leland | 455/139 |
| 4,361,890 | 11/1982 | Green, Jr. et al. | 375/1 |
| 4,361,891 | 11/1982 | Lobenstein et al. | 343/100 |
| 4,365,327 | 12/1982 | Pirani | 370/18 |
| 4,394,760 | 7/1983 | Kammerlander | 370/111 |
| 4,398,289 | 8/1983 | Schoute | 370/93 |
| 4,434,323 | 2/1984 | Levine et al. | 178/22.17 |
| 4,451,916 | 5/1984 | Casper et al. | 370/16 |
| 4,460,992 | 7/1984 | Gutleber | 370/19 |
| 4,472,815 | 9/1984 | Gutleber | 375/34 |
| 4,484,335 | 11/1984 | Mosley et al. | 375/1 |
| 4,501,002 | 2/1985 | Auchterlonie | 375/86 |
| 4,512,024 | 4/1985 | Gutleber | 375/34 |
| 4,536,875 | 8/1985 | Kume et al. | 370/85 |
| 4,551,853 | 11/1985 | Demen et al. | 455/72 |
| 4,559,633 | 12/1985 | Kan et al. | 375/1 |
| 4,561,089 | 12/1985 | Rouse et al. | 370/18 |
| 4,567,588 | 1/1986 | Jerrim | 370/18 |
| 4,601,047 | 7/1986 | Horowitz et al. | 375/2.2 |
| 4,607,375 | 8/1986 | Lee | 375/2.2 |
| 4,621,365 | 11/1986 | Chiu | 375/1 |
| 4,630,283 | 12/1986 | Schiff | 375/1 |
| 4,635,221 | 1/1987 | Kerr | 364/821 |
| 4,649,549 | 3/1987 | Halpern et al. | 380/32 |
| 4,665,514 | 5/1987 | Ching et al. | 370/60 |
| 4,669,089 | 5/1987 | Gahagan et al. | 375/1 |
| 4,672,658 | 6/1987 | Kavehrad et al. | 379/63 |
| 4,688,035 | 8/1987 | Gray et al. | 340/825.52 |
| 4,703,474 | 10/1987 | Foschini et al. | 370/18 |
| 4,730,340 | 3/1988 | Frazier, Jr. | 375/1 |
| 4,754,450 | 6/1988 | Lynk, Jr. et al. | 375/1 |
| 4,785,463 | 11/1988 | Janc et al. | 370/29 |
| 4,809,295 | 2/1989 | Zscheile, Jr. et al. | 375/1 |
| 4,813,040 | 3/1989 | Futato | 375/1 |
| 4,843,612 | 6/1989 | Brusch et al. | 370/111 |
| 4,872,200 | 10/1989 | Jansen | 380/34 |
| 4,894,842 | 1/1990 | Broekhoven et al. | 375/1 |
| 4,901,307 | 2/1990 | Gilhousen et al. | 370/18 |
| 4,933,952 | 6/1990 | Albrieux et al. | 375/1 |
| 4,939,745 | 7/1990 | Kirimoto et al. | 375/1 |
| 4,942,591 | 7/1990 | Nease et al. | 375/84 |
| 4,951,150 | 8/1990 | Iwasaki | 375/1 |
| 4,953,178 | 8/1990 | Ishigaki | 375/1 |
| 4,958,359 | 9/1990 | Kato | 375/1 |
| 4,962,507 | 10/1990 | Renshaw | 375/1 |
| 4,980,897 | 12/1990 | Decker et al. | 380/38 |
| 5,003,533 | 3/1991 | Watanabe | 370/85.5 |
| 5,005,169 | 4/1991 | Bronder et al. | 370/76 |
| 5,022,046 | 6/1991 | Morrow, Jr. | 375/1 |
| 5,056,109 | 10/1991 | Gilhousen et al. | 375/1 |
| 5,068,849 | 11/1991 | Tanaka | 370/85.5 |
| 5,091,940 | 2/1992 | Clebowicz | 380/37 |
| 5,101,501 | 3/1992 | Gilhousen et al. | 455/33 |
| 5,103,459 | 4/1992 | Gilhousen et al. | 375/1 |
| 5,109,390 | 5/1992 | Gilhousen et al. | 375/1 |
| 5,136,586 | 8/1992 | Greenblatt | 370/110.4 |
| 5,150,387 | 9/1992 | Yoshikawa et al. | 375/122 |
| 5,177,767 | 1/1993 | Kato | 375/1 |
| 5,199,045 | 3/1993 | Kato | 375/1 |
| 5,204,876 | 4/1993 | Bruckert et al. | 375/1 |
| 5,212,684 | 5/1993 | MacNamee et al. | 370/24 |
| 5,218,639 | 6/1993 | Osterweil | 380/34 |
| 5,258,983 | 11/1993 | Lane et al. | 370/118 |
| 5,260,969 | 11/1993 | Kato et al. | 375/1 |
| 5,274,836 | 12/1993 | Lux | 455/1 |
| 5,309,474 | 5/1994 | Gilhousen et al. | 375/1 |
| 5,341,396 | 8/1994 | Higgins et al. | 375/1 |
| 5,365,543 | 11/1994 | Takahashi et al. | 375/1 |
| 5,416,797 | 5/1995 | Gilhousen et al. | 375/705 |
| 5,418,813 | 5/1995 | Scaffner et al. | 375/205 |
| 5,442,625 | 8/1995 | Gitlin et al. | 370/18 |
| 5,455,841 | 10/1995 | Hazu | 375/240 |
| 5,550,809 | 8/1996 | Bottomley et al. | 370/209 |
| 5,619,526 | 4/1997 | Kim et al. | 370/209 |
| 5,623,485 | 4/1997 | Bi | 370/209 |

OTHER PUBLICATIONS

"Multiple Access to a Communications Satellite with Hard–Limiting Repeater", J.M. Aein et al., *IDA*, vol. II, Apr. 1965, 10 pages.

"Shift Register Sequences" Holden–Day, Inc. Solomon W. Golomb, pp. 192–197.

"An Annotated History of Codorac: 1953–1958", E. Rechtin, *Jet Propulsion Laboratory*, Jul. 9, 1981, Report No. 20–120, pp. 1–22.

"Spread Spectrum Communications", Marvin K. Simon et al. *Computer Science Press*, vol. I, 1985, pp. 98–104.

"Walsh Function Generator for a Millionn Different Functions", Fredick J. Lebert *Applications of Walsh Functions*, 1970, pp. 52–54.

Digital Generation of Walsh Functions for Orthogonal Multiplexing Application Jhong S. Lee, *Application of Walsh Functions*, pp. 222–227.

"Sequential Circuits and Walsh Functions", Philipp W. Besslich, *Applications of Walsh Functions*, 1974, pp. 154–157.

"Binary Logic Walsh Function Generator", H.H. Nick, *IBM Technical Disclosure Bulleti*, vol. 22 No. 10, Mar. 1980, pp. 4650–4651.

"On Interference Suppression Using Complementary filters in DS–DSS" Bong Woon Lee et al., IEEE, vol. 2, 1989, pp. 0486–0490.

"Nonlinear Estimation of PSK–Modulation Carrier Phase with Application to Burst Digital Transmission", Andrew J. Viterbi et al. IEEE Transaction on Information Theory, vol. IT–29, No. Jul. 4, 1983, pp. 543–551.

"Spectral Efficiency in Cellular Land–Mobile Communications: A Spread Spectrum Approach", Nettleton, Raymond W., *U–M–I dissertation Information Service*, 1978.

"Power Contol and Interference Management in a Spread–Spectrum Cellular Mobile Radio System", Alavi, Hossein, *U–M–I Dissertation Information Service*, 1984.

"Advance Engineering Mathematics", Kreyszig, Erwin, 1979, John Wiley & Sons, Section 4.7, pp. 186–190.

"Die Erzeugung Von Walsh–Funktionen", Von Claus BoBwetter, *NZT*, 1970, pp. 201–207.

"Walsh–Functions, Generation and Application", Thomas Roddam, 3 Pages.

Walshfunktionen–Generator, Gerd Scarbata, *Radio Fernsehen Elektronik*, 1973, pp. 470–474.

"Walsh–Funkionen Und Ihre Erzeugung", G. Scarbata, *Nachrichtentechnik–Elektronik*, 1976, pp. 111–116.

"Realisierung Von Walsh–Funtionsgeneratoren", Gerd Scarbata, *Radio Fernseben Elektornik*, 1978, pp. 117–119.

Cellular Mobile Technology: The Great Multiplier *IEEE Spectrum advanced Technology*, George R. Cooper et al., pp. 30–37.

"A Spread Spectrum Technique for High Mobile Communication", George R. Cooper et al. *Record of the IEEE Conference of Vehicular Technology*, Mar. 16–18, pp. 98–103.

"Ratio Squarer", Leonard R. Kahn, I–R–E. Nov. 1954, p. 1704.

Albrat R. Karr et al., "Digital Phones Cause Problems in Hearing Aids", The Wall Street Journal, 2 Pages.

GSM Has Problems Which are Now Attracting Attention Around The World. Will Actin Be Taken To Resolve Them?, Australian Communications, Jul. 1993, 8 Pages.

Bill Machrone, "America's Telecommunications Industry Is teetering On The Brink. The FCC Auctioned Off Billions Of Dollars' Worth Of Radion Spectrum For The Industry To Offer New Wireless Services, Called PS (personal Communications Services). The Winners Must", Jul. 1995, p. 85.

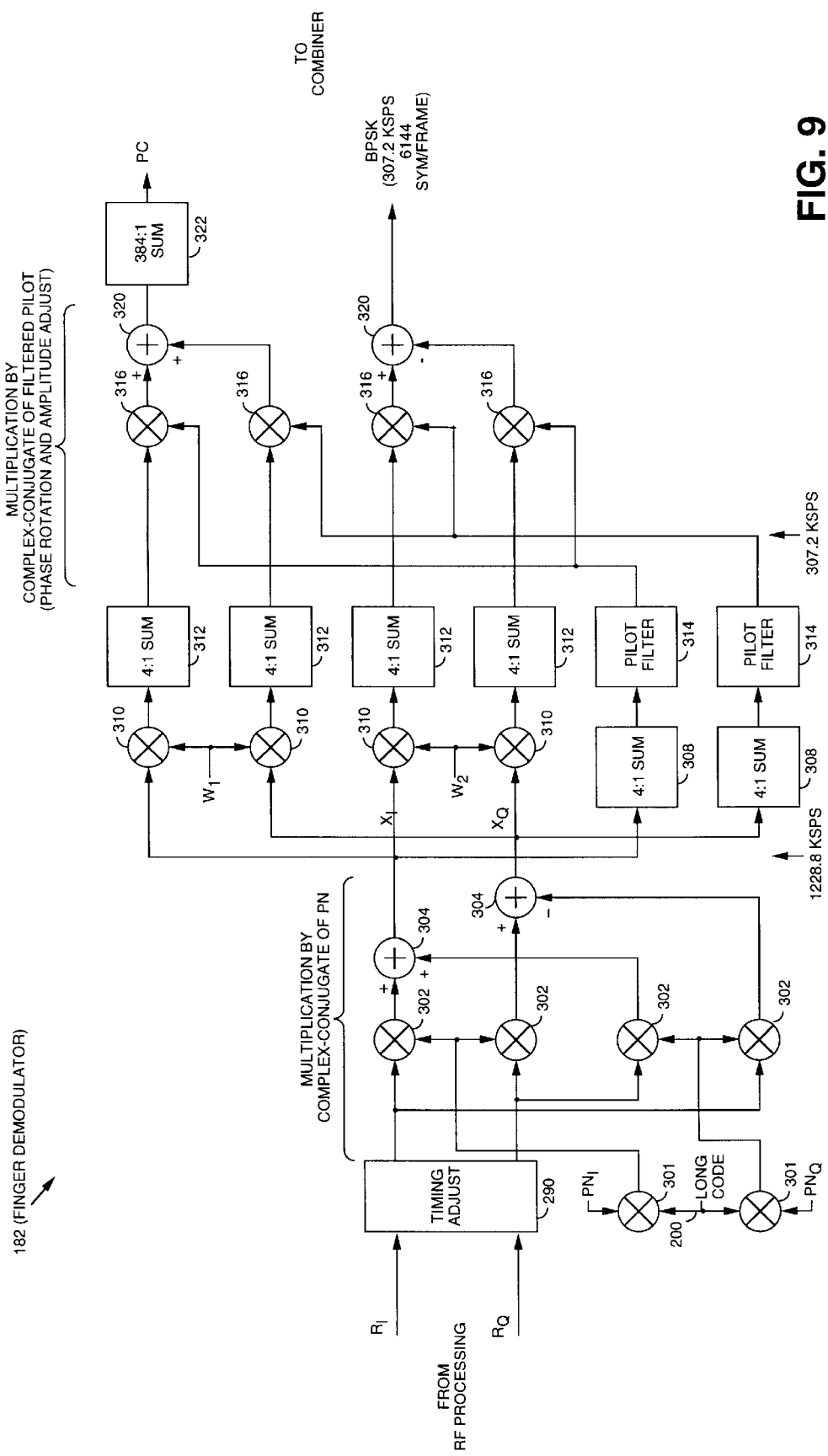

REDUCED PEAK-TO-AVERAGE TRANSMIT POWER HIGH DATA RATE CDMA WIRELESS COMMUNICATION SYSTEM

BACKGROUND OF THE INVENTION

I. Field of the Invention

The present invention relates to communications. More particularly, the present invention relates to a novel and improved method and apparatus for high data rate CDMA wireless communication.

II. Description of the Related Art

Wireless communication systems including cellular, satellite and point to point communication systems use a wireless link comprised of a modulated radio frequency (RF) signal to transmit data between two systems. The use of a wireless link is desirable for a variety of reasons including increased mobility and reduced infrastructure requirements when compared to wire line communication systems. One drawback of using a wireless link is the limited amount of communication capacity that results from the limited amount of available RF bandwidth. This limited communication capacity is in contrast to wire based communication systems where additional capacity can be added by installing additional wire line connections.

Recognizing the limited nature of RF bandwidth, various signal processing techniques have been developed for increasing the efficiency with which wireless communication systems utilize the available RF bandwidth. One widely accepted example of such a bandwidth efficient signal processing technique is the IS-95 over the air interface standard and its derivatives such as IS-95-A (referred to hereafter collectively as the IS-95 standard) promulgated by the telecommunication industry association (TIA) and used primarily within cellular telecommunications systems. The IS-95 standard incorporates code division multiple access (CDMA) signal modulation techniques to conduct multiple communications simultaneously over the same RF bandwidth. When combined with comprehensive power control, conducting multiple communications over the same bandwidth increases the total number of calls and other communications that can be conducted in a wireless communication system by, among other things, increasing the frequency reuse in comparison to other wireless telecommunication technologies. The use of CDMA techniques in a multiple access communication system is disclosed in U.S. Pat. No. 4,901,307, entitled "SPREAD SPECTRUM COMMUNICATION SYSTEM USING SATELLITE OR TERRESTRIAL REPEATERS", and U.S. Pat. No. 5,103,459, entitled "SYSTEM AND METHOD FOR GENERATING SIGNAL WAVEFORMS IN A CDMA CELLULAR TELEPHONE SYSTEM", both of which are assigned to the assignee of the present invention and incorporated by reference herein.

FIG. 1 provides a highly simplified illustration of a cellular telephone system configured in accordance with the use of the IS-95 standard. During operation, a set of subscriber units 10a–d conduct wireless communication by establishing one or more RF interfaces with one or more base stations 12a–d using CDMA modulated RF signals. Each RF interface between a base station 12 and a subscriber unit 10 is comprised of a forward link signal transmitted from the base station 12, and a reverse link signal transmitted from the subscriber unit. Using these RF interfaces, a communication with another user is generally conducted by way of mobile telephone switching office (MTSO) 14 and public switch telephone network (PSTN) 16. The links between base stations 12, MTSO 14 and PSTN 16 are usually formed via wire line connections, although the use of additional RF or microwave links is also known.

In accordance with the IS-95 standard each subscriber unit 10 transmits user data via a single channel, non-coherent, reverse link signal at a maximum data rate of 9.6 or 14.4 kbits/sec depending on which rate set from a set of rate sets is selected. A non-coherent link is one in which phase information is not utilized by the received system. A coherent link is one in which the receiver exploits knowledge of the carrier signals phase during processing. The phase information typically takes the form of a pilot signal, but can also be estimated from the data transmitted. The IS-95 standard calls for a set of sixty four Walsh codes, each comprised of sixty four chips, to be used for the forward link.

The use of a single channel, non-coherent, reverse link signal having a maximum data rate of 9.6 of 14.4 kbits/sec as specified by IS-95 is well suited for a wireless cellular telephone system in which the typical communication involves the transmission of digitized voice or lower rate digital data such a facsimile. A non-coherent reverse link was selected because, in a system in which up to 80 subscriber units 10 may communicate with a base station 12 for each 1.2288 MHz of bandwidth allocated, providing the necessary pilot data in the transmission from each subscriber unit 10 would substantially increase the degree to which a set of subscriber units 10 interfere with one another. Also, at data rates of 9.6 or 14.4 kbits/sec, the ratio of the transmit power of any pilot data to the user data would be significant, and therefore also increase inter-subscriber unit interference. The use of a single channel reverse link signal was chosen because engaging in only one type of communication at a time is consistent with the use of wireline telephones, the paradigm on which current wireless cellular communications is based. Also, the complexity of processing a single channel is less than that associated with processing multiple channels.

As digital communications progress, the demand for wireless transmission of data for applications such as interactive file browsing and video teleconferencing is anticipated to increase substantially. This increase will transform the way in which wireless communications systems are used, and the conditions under which the associated RF interfaces are conducted. In particular, data will be transmitted at higher maximum rates and with a greater variety of possible rates. Also, more reliable transmission may become necessary as errors in the transmission of data are less tolerable than errors in the transmission of audio information. Additionally, the increased number of data types will create a need to transmit multiple types of data simultaneously. For example, it may be necessary to exchange a data file while maintaining an audio or video interface. Also, as the rate of transmission from a subscriber unit increases the number of subscriber units 10 communicating with a base station 12 per amount of RF bandwidth will decrease, as the higher data transmission rates will cause the data processing capacity of the base station to be reached with fewer subscriber units 10. In some instances, the current IS-95 reverse link may not be ideally suited for all these changes. Therefore, the present invention is related to providing a higher data rate, bandwidth efficient, CDMA interface over which multiple types of communication can be performed.

SUMMARY OF THE INVENTION

A novel and improved method and apparatus for high rate CDMA wireless communication is described. In accordance with one embodiment of the invention, a set of individually gain adjusted subscriber channels are formed via the use of a set of orthogonal subchannel codes having a small number of PN spreading chips per orthogonal waveform period. Data to be transmitted via one of the transmit channels is low code rate error correction encoded and sequence repeated before being modulated with one of the subchannel codes, gain adjusted, and summed with data modulated using the other subchannel codes. The resulting summed data is modulated using a user long code and a pseudorandom spreading code (PN code) and upconverted for transmission. The use of the short orthogonal codes provides interference suppression while still allowing extensive error correction coding and repetition for time diversity to overcome the Raleigh fading commonly experienced in terrestrial wireless systems. In the exemplary embodiment of the invention provided, the set of sub-channel codes are comprised of four Walsh codes, each orthogonal to the remaining set and four chips in duration. The use of four sub-channels is preferred as it allows shorter orthogonal codes to be used, however, the use of a greater number of channels and therefore longer codes is consistent with the invention.

In a preferred exemplary embodiment of the invention, pilot data is transmitted via a first one of the transmit channels and power control data transmitted via a second transmit channel. The remaining two transmit channels are used for transmitting non-specified digital data including user data or signaling data, or both. In an exemplary embodiment, one of the two non-specified transmit channels is configured for BPSK modulation and transmission over the quadrature channel.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 9 is a block diagram of a finger processing system configured in accordance with one embodiment of the invention.

DETAILED DESCRIPTION OF THE PREFERRED EMBODIMENTS

A novel and improved method and apparatus for high rate CDMA wireless communication is described in the context of the reverse link transmission portion of a cellular telecommunications system. While the invention is particularly adapted for use within the multipoint-to-point reverse link transmission of a cellular telephone system, the present invention is equally applicable to forward link transmissions. In addition, many other wireless communication systems will benefit by incorporation of the invention, including satellite based wireless communication systems, point to point wireless communication systems, and systems transmitting radio frequency signals via the use of co-axial or other broadband cables.

Figure 1:
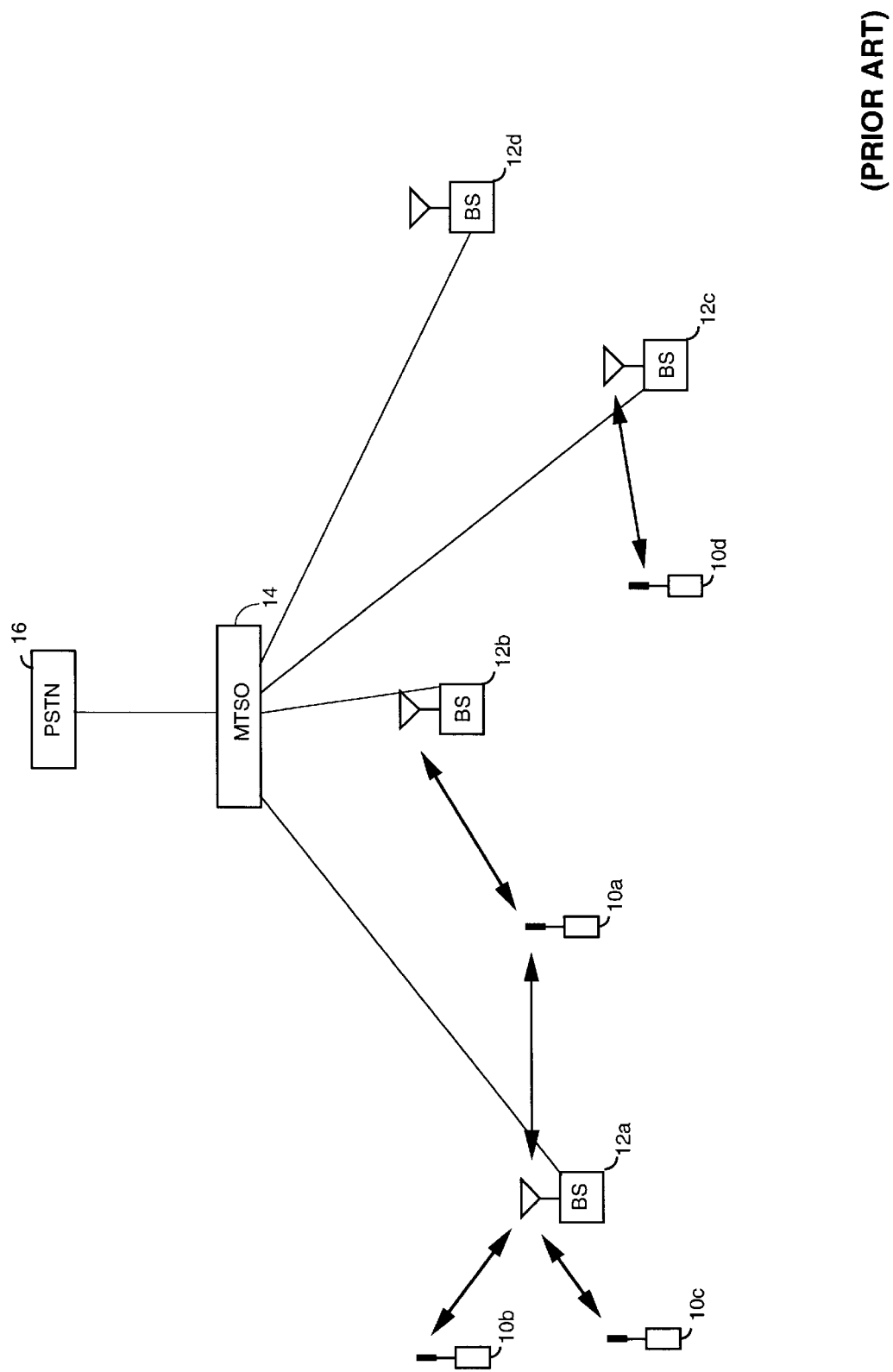
FIG. 1 is a block diagram of cellular telephone system.
Figure 2:
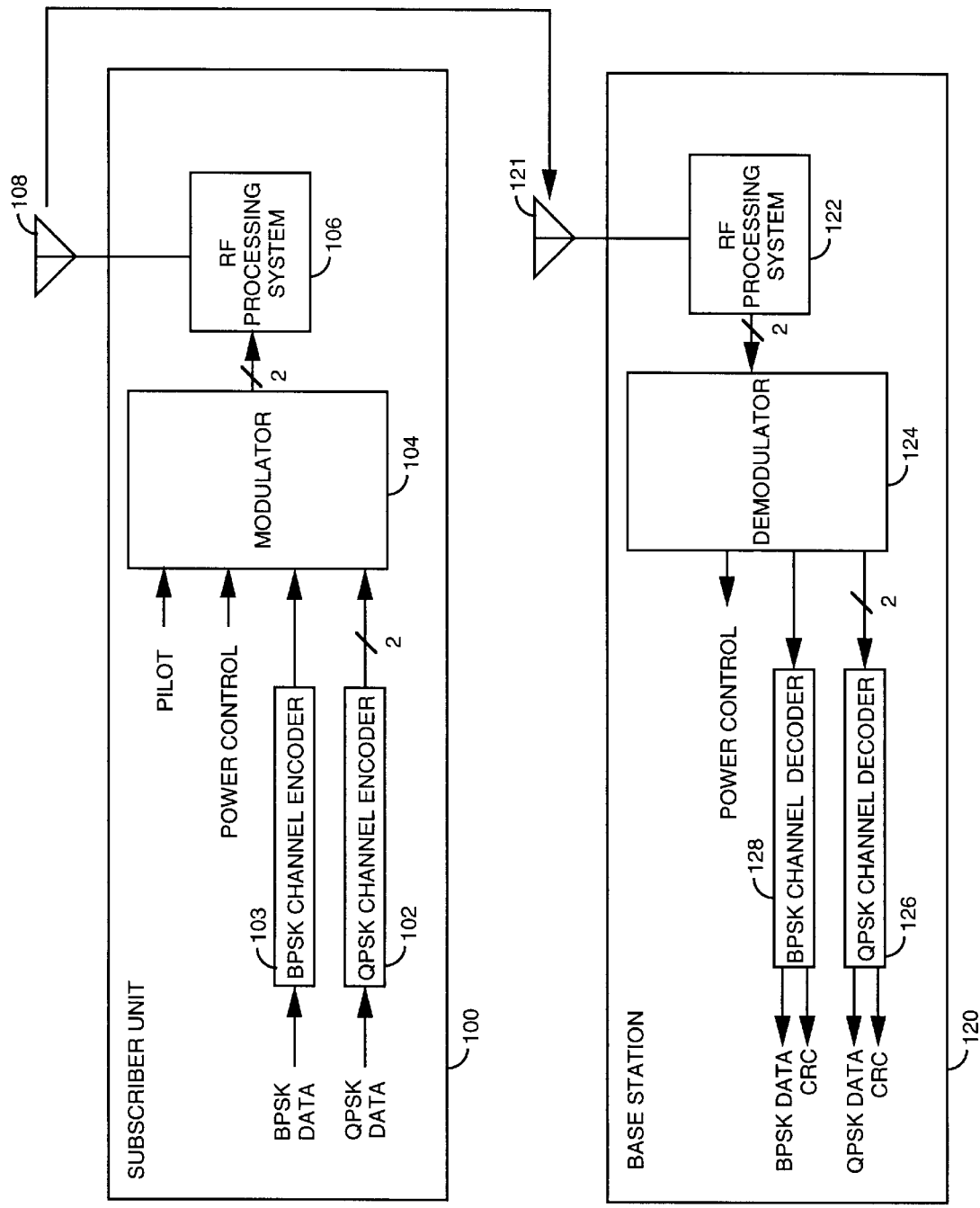
FIG. 2 is a block diagram of a subscriber unit and base station configured in accordance with the exemplary embodiment of the invention.

FIG. 2 is a block diagram of receive and transmit systems configured as a subscriber unit 100 and a base station 120 in accordance with one embodiment of the invention. A first set of data (BPSK data) is received by BPSK channel encoder 103, which generates a code symbol stream configured for performing BPSK modulation that is received by modulator 104. A second set of data (QPSK data) is received by QPSK channel encoder 102, which generates a code symbol stream configured for performing QPSK modulation that is also received by modulator 104. Modulator 104 also receives power control data and pilot data, which are modulated along with the BPSK and QPSK encoded data in accordance with code division multiple access (CDMA) techniques to generate a set of modulation symbols received by RF processing system 106. RF processing system 106 filters and upconverts the set of modulation symbols to a carrier frequency for transmission to the base station 120 using antenna 108. While only one subscriber unit 100 is shown, multiple subscriber units communicate with base station 120 in the preferred embodiment.

Within base station 120, RF processing system 122 receives the transmitted RF signals by way of antenna 121 and performs bandpass filtering, downconversion to baseband, and digitization. Demodulator 124 receives the digitized signals and performs demodulation in accordance with CDMA techniques to produce power control, BPSK, and QPSK soft decision data. BPSK channel decoder 128 decodes the BPSK soft decision data received from demodulator 124 to yield a best estimate of the BPSK data, and QPSK channel decoder 126 decodes the QPSK soft decision data received by demodulator 124 to produce a best estimate of the QPSK data. The best estimate of first and second set of data is then available for further processing or forwarding to a next destination, and the received power control data used either directly, or after decoding, to adjust the transmit power of the forward link channel used to transmit data to subscriber unit 100.

Figure 3:
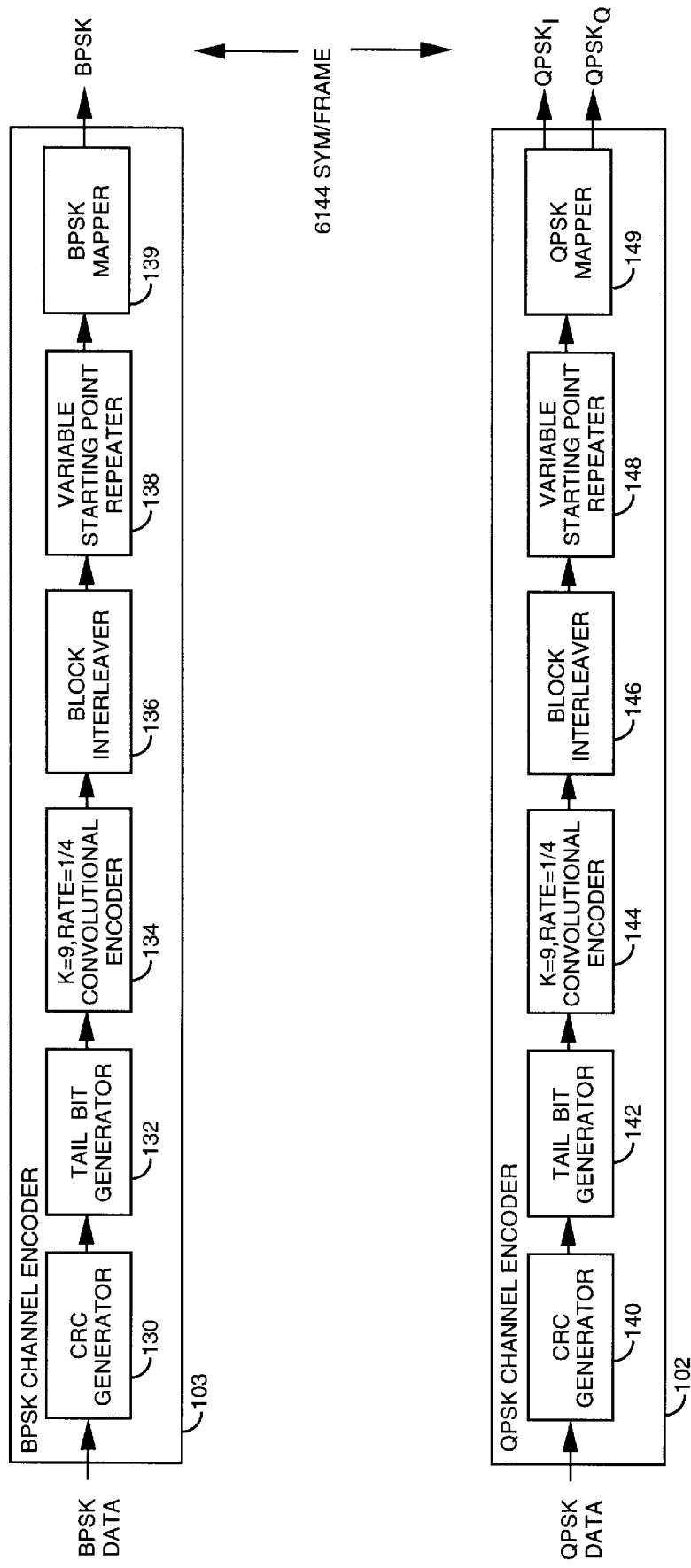
FIG. 3 is a block diagram of a BPSK channel encoder and a QPSK channel encoder configured in accordance with the exemplary embodiment of the invention.

FIG. 3 is a block diagram of BPSK channel encoder 103 and QPSK channel encoder 102 when configured in accordance with the exemplary embodiment of the invention. Within BPSK channel encoder 103 the BPSK data is received by CRC check sum generator 130 which generates a check sum for each 20 ms frame of the first set of data. The frame of data along with the CRC check sum is received by tail bit generator 132 which appends tail bits comprised of eight logic zeros at the end of each frame to provide a known state at the end of the decoding process. The frame including the code tail bits and CRC check sum is then received by convolutional encoder 134 which performs, constraint length (K) 9, rate (R) ¼ convolutional encoding thereby generating code symbols at a rate four times the encoder input rate ($E_R$). In the alternative embodiment of the invention, other encoding rates are performed including rate ½, but the use of rate ¼ is preferred due to its optimal complexity-performance characteristics. Block interleaver 136 performs bit interleaving on the code symbols to provide time diversity for more reliable transmission in fast fading environments. The resulting interleaved symbols are received by variable starting point repeater 138, which repeats the interleaved symbol sequence a sufficient number of times $N_R$ to provide a constant rate symbol stream, which corresponds to outputting frames having a constant number of symbols. Repeating the symbol sequence also increases the time diversity of the data to overcome fading. In the exemplary embodiment, the constant number of symbols is equal to 6,144 symbols for each frame making the symbol rate 307.2 kilosymbols per second (ksps). Also, repeater 138 uses a different starting point to begin the repetition for each symbol sequence. When the value of $N_R$ necessary to generate 6,144 symbols per frame is not an integer, the final repetition is only performed for a portion of the symbol sequence. The resulting set of repeated symbols are received by BPSK mapper 139 which generates a BPSK code symbol stream (BPSK) of +1 and −1 values for performing BPSK modulation. In an alternative embodiment of the invention repeater 138 is placed before block interleaver 136 so that block interleaver 136 receives the same number of symbols for each frame.

Within QPSK channel encoder 102 the QPSK data is received by CRC check sum generator 140 which generates a check sum for each 20 ms frame. The frame including the CRC check sum is received by code tail bits generator 142 which appends a set of eight tail bits of logic zeros at the end of the frame. The frame, now including the code tail bits and CRC check sum, is received by convolutional encoder 144 which performs K=9, R=¼ convolutional encoding thereby generating symbols at a rate four times the encoder input rate ($E_R$). Block interleaver 146 performs bit interleaving on the symbols and the resulting interleaved symbols are received by variable starting point repeater 148. Variable starting point repeater 148 repeats the interleaved symbol sequence a sufficient number of times $N_R$ using a different starting point within the symbol sequence for each repetition to generate 12,288 symbols for each frame making the code symbol rate 614.4 kilosymbols per second (ksps). When $N_R$ is not an integer, the final repetition is performed for only a portion of the symbol sequence. The resulting repeated symbols are received by QPSK mapper 149 which generates a QPSK code symbol stream configured for performing QPSK modulation comprised of an in-phase QPSK code symbol stream of +1 and −1 values ($QPSK_I$), and a quadrature-phase QPSK code symbol stream of +1 and −1 values ($QPSK_Q$). In an alternative embodiment of the invention repeater 148 is placed before block interleaver 146 so that block interleaver 146 receives the same number of symbols for each frame.

Figure 4:
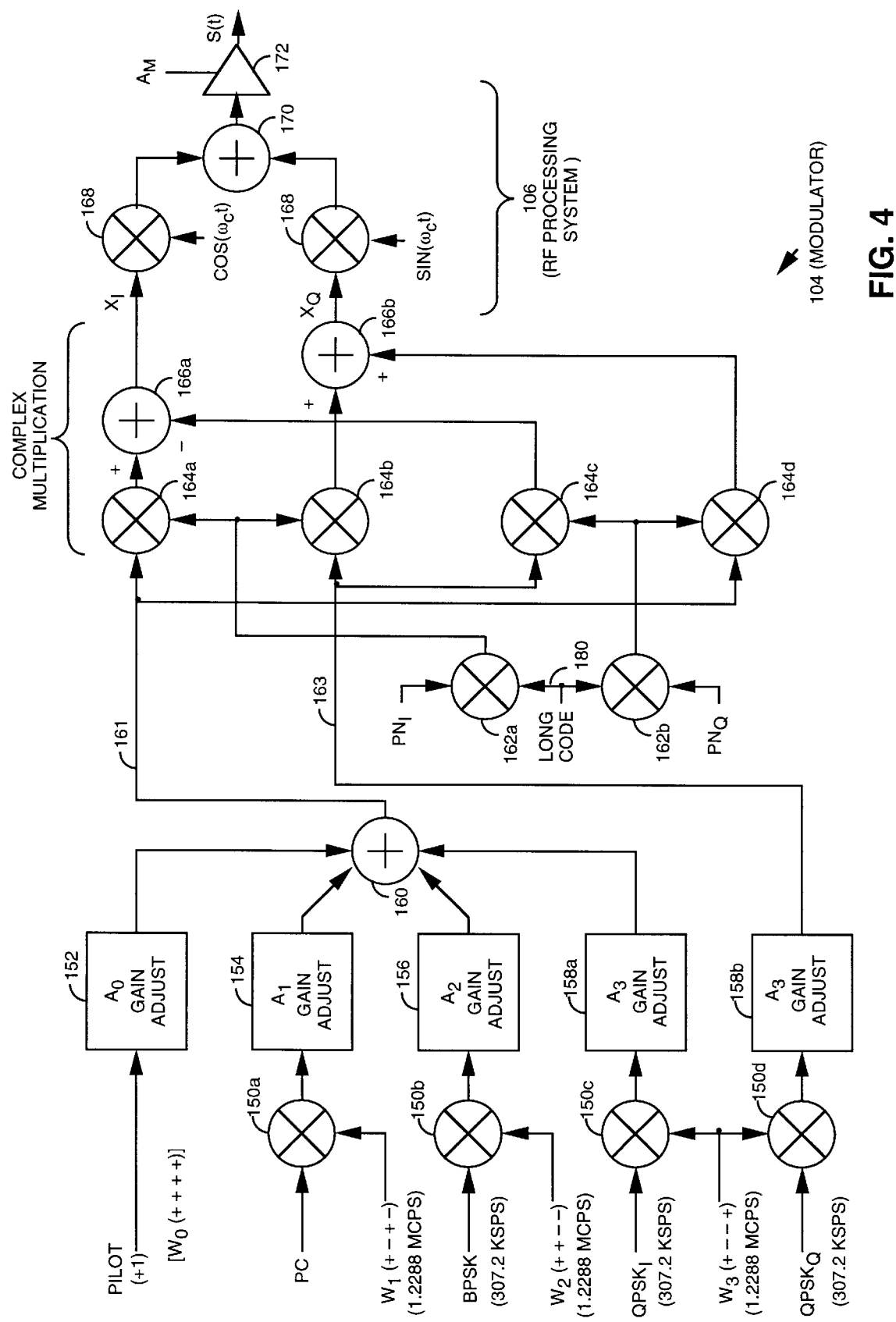
FIG. 4 is a block diagram of a transmit signal processing system configured in accordance with the exemplary embodiment of the invention.

FIG. 4 is a block diagram of modulator 104 of FIG. 2 configured in accordance with the exemplary embodiment of the invention. The BPSK symbols from BPSK channel encoder 103 are each modulated by Walsh code $W_2$ using a multiplier 150b, and the $QPSK_I$ and $QPSK_Q$ symbols from QPSK channel encoder 102 are each modulated with Walsh code $W_3$ using multipliers 150c and 154d. The power control data (PC) is modulated by Walsh code $W_1$ using multiplier 150a. Gain adjust 152 receives pilot data (PILOT), which in the preferred embodiment of the invention is comprised of the logic level associate with positive voltage, and adjust the amplitude according to a gain adjust factor $A_0$. The PILOT signal provides no user data but rather provides phase and amplitude information to the base station so that it can coherently demodulate the data carried on the remaining sub-channels, and scale the soft-decision output values for combining. Gain adjust 154 adjusts the amplitude of the Walsh code $W_1$ modulated power control data according to gain adjust factor $A_1$, and gain adjust 156 adjusts the amplitude of the Walsh code $W_2$ modulated BPSK channel data according amplification variable $A_2$. Gain adjusts 158a and b adjust the amplitude of the in-phase and quadrature-phase Walsh code $W_3$ modulated QPSK symbols respectively according to gain adjust factor $A_3$. The four Walsh codes used in the preferred embodiment of the invention are shown in Table I.

TABLE I

| Walsh Code | Modulation Symbols |
|---|---|
| $W_0$ | + + + + |
| $W_1$ | + − + − |
| $W_2$ | + + − − |
| $W_3$ | + − − + |

It will be apparent to one skilled in the art that the $W_0$ code is effectively no modulation at all, which is consistent with processing of the pilot data shown. The power control data is modulated with the $W_1$ code, the BPSK data with the $W_2$ code, and the QPSK data with the $W_3$ code. Once modulated with the appropriate Walsh code, the pilot, power control data, and BPSK data are transmitted in accordance with BPSK techniques, and the QPSK data ($QPSK_I$ and $QPSK_Q$) in accordance with QPSK techniques as described below. It should also be understood that it is not necessary that every orthogonal channel be used, and that the use of only three of the four Walsh codes where only one user channel is provided is employed in an alternative embodiment of the invention.

The use of short orthogonal codes generates fewer chips per symbol, and therefore allows for more extensive coding and repetition when compared to systems incorporating the use of longer Walsh codes. This more extensive coding and repetition provides protection against Raleigh fading which is a major source of error in terrestrial communication systems. The use of other numbers of codes and code lengths is consistent with the present invention, however, the use of a larger set of longer Walsh codes reduces this enhanced protection against fading. The use of four chip codes is considered optimal because four channels provides substantial flexibility for the transmission of various types of data as illustrated below while also maintaining short code length.

Summer 160 sums the resulting amplitude adjusted modulation symbols from gain adjusts 152, 154, 156 and 158a to generate summed modulation symbols 161. PN spreading codes $PN_I$ and $PN_Q$ are spread via multiplication with long code 180 using multipliers 162a and b. The resulting pseudorandom code provided by multipliers 162a and 162b are used to modulate the summed modulation symbols 161, and gain adjusted quadrature-phase symbols $QPSK_Q$ 163, via complex multiplication using multipliers 164a–d and summers 166a and b. The resulting in-phase term $X_I$ and quadrature-phase term $X_Q$ are then filtered (filtering not shown), and upconverted to the carrier frequency within RF processing system 106 shown in a highly simplified form using multipliers 168 and an in-phase and a quadrature-phase sinusoid. An offset QPSK upconversion could also be used in an alternative embodiment of the invention. The resulting in-phase and quadrature-phase upconverted signals are summed using summer 170 and amplified by master amplifier 172 according to master gain adjust $A_M$ to generate signal s(t) which is transmitted to base station 120. In the preferred embodiment of the invention, the signal is spread and filtered to a 1.2288 MHz bandwidth to remain compatible with the bandwidth of existing CDMA channels.

By providing multiple orthogonal channels over which data may be transmitted, as well as by using variable rate repeaters that reduce the amount of repeating $N_R$ performed in response to high input data rates, the above described method and system of transmit signal processing allows a single subscriber unit or other transmit system to transmit data at a variety of data rates. In particular, by decreasing the rate of repetition $N_R$ performed by variable starting point repeaters 138 or 148 of FIG. 3, an increasingly higher encoder input rate $E_R$ can be sustained. In an alternative embodiment of the invention rate ½ convolution encoding is performed with the rate of repetition $N_R$ increased by two. A set of exemplary encoder rates $E_R$ supported by various rates of repetition $N_R$ and encoding rates R equal to ¼ and ½ for the BPSK channel and the QPSK channel are shown in Tables II and III respectively.

IS-95 compliant communication systems, and therefore are also expected to receive substantial use for purposes of compatibility. The null rate is the transmission of a single bit and is used to indicate a frame erasure, which is also part of the IS-95 standard.

The data transmission rate may also be increased by simultaneously transmitting data over two or more of the multiple orthogonal channels performed either in addition to, or instead of, increasing the transmission rate via reduction of the repetition rate $N_R$. For example, a multiplexer (not shown) could split a single data source into a multiple data sources to be transmitted over multiple data subchannels. Thus, the total transmit rate can be increased via either transmission over a particular channel at higher rates, or multiple transmission performed simultaneously over multiple channels, or both, until the signal processing capability of the receive system is exceeded and the error rate becomes unacceptable, or the maximum transmit power of the of the transmit system power is reached.

TABLE II

BPSK Channel

| Label | $E_{R,BPSK}$ (bps) | Encoder Out R = ¼ (bits/frame) | $N_{R,R=¼}$ (Repetition Rate, R = ¼) | Encoder Out R = ½ (bits/frame) | $N_{R,R=½}$ (Repetition Rate, R = ½) |
|---|---|---|---|---|---|
| High Rate-72 | 76,800 | 6,144 | 1 | 3,072 | 2 |
| High Rate-64 | 70,400 | 5,632 | 1 ¹/₁₁ | 2,816 | 2 ²/₁₁ |
|  | 51,200 | 4,096 | 1 ½ | 2,048 | 3 |
| High Rate-32 | 38,400 | 3,072 | 2 | 1,536 | 4 |
|  | 25,600 | 2,048 | 3 | 1,024 | 6 |
| RS2-Full Rate | 14,400 | 1,152 | 5 ⅓ | 576 | 10 ⅔ |
| RS1-Full Rate | 9,600 | 768 | 8 | 384 | 16 |
| NULL | 850 | 68 | 90 ⁶/₁₇ | 34 | 180 ¹²/₁₇ |

TABLE III

QPSK Channel

| Label | $E_{R,QPSK}$ (bps) | Encoder Out R = ¼ (bits/frame) | $N_{R,R=¼}$ (Repetition Rate, R = ¼) | Encoder Out R = ½ (bits/frame) | $N_{R,R=½}$ (Repetition Rate, R = ½) |
|---|---|---|---|---|---|
|  | 153,600 | 12,288 | 1 | 6,144 | 2 |
| Hiqh Rate-72 | 76,800 | 6,144 | 2 | 3,072 | 4 |
| High Rate-64 | 70,400 | 5,632 | 2 ²/₁₁ | 2,816 | 4 ⁴/₁₁ |
|  | 51,200 | 4,096 | 3 | 2,048 | 6 |
| High Rate-32 | 38,400 | 3,072 | 4 | 1,536 | 8 |
|  | 25,600 | 2,048 | 6 | 1,024 | 12 |
| RS2-Full Rate | 14,400 | 1,152 | 10 ⅔ | 576 | 21 ⅓ |
| RS1-Full Rate | 9,600 | 768 | 16 | 384 | 32 |
| NULL | 850 | 68 | 180 ¹²/₁₇ | 34 | 361 ⁷/₁₇ |

Tables II and III show that by adjusting the number of sequence repetitions $N_R$, a wide variety of data rates can be supported including high data rates, as the encoder input rate $E_R$ corresponds to the data transmission rate minus a constant necessary for the transmission of CRC, code tail bits and any other overhead information. As also shown by tables II and III, QPSK modulation may also be used to increase the data transmission rate. Rates expected to be used commonly are provided labels such as "High Rate-72" and "High Rate-32." Those rates noted as High Rate-72, High Rate-64, and High Rate-32 have traffic rates of 72, 64 and 32 kbps respectively, plus multiplexed in signaling and other control data with rates of 3.6, 5.2, and 5.2 kbps respectively, in the exemplary embodiment of the invention. Rates RS1-Full Rate and RS2-Full Rate correspond to rates used in Providing multiple channels also enhances flexibility in the transmission of different types of data. For example, the BPSK channel may be designated for voice information and the QPSK channel designated for transmission of digital data. This embodiment could be more generalized by designating one channel for transmission of time sensitive data such as voice at a lower data rate, and designating the other channel for transmission of less time sensitive data such as digital files. In this embodiment interleaving could be performed in larger blocks for the less time sensitive data to further increase time diversity. In another embodiment of the invention, the BPSK channel performs the primary transmission of data, and the QPSK channel performs overflow transmission. The use of orthogonal Walsh codes eliminates or substantially reduces any interference among the set of channels transmitted from a subscriber unit, and thus minimizes the transmit energy necessary for their successful reception at the base station.

To increase the processing capability at the receive system, and therefore increase the extent to which the higher transmission capability of the subscriber unit may be utilized, pilot data is also transmitted via one of the orthogonal channels. Using the pilot data, coherent processing can be performed at the receive system by determining and removing the phase offset of the reverse link signal. Also, the pilot data can be used to optimally weigh multipath signals received with different time delays before being combined in a rake receiver. Once the phase offset is removed, and the multipath signals properly weighted, the multipath signals can be combined decreasing the power at which the reverse link signal must be received for proper processing. This decrease in the required receive power allows greater transmissions rates to be processed successfully, or conversely, the interference between a set of reverse link signals to be decreased. While some additional transmit power is necessary for the transmission of the pilot signal, in the context of higher transmission rates the ratio of pilot channel power to the total reverse link signal power is substantially lower than that associated with lower data rate digital voice data transmission cellular systems. Thus, within a high data rate CDMA system the $E_b/N_0$ gains achieved by the use of a coherent reverse link outweigh the additional power necessary to transmit pilot data from each subscriber unit.

The use of gain adjusts 152–158 as well as master amplifier 172 further increases the degree to which the high transmission capability of the above described system can be utilized by allowing the transmit system to adapt to various radio channel conditions, transmission rates, and data types. In particular, the transmit power of a channel that is necessary for proper reception may change over time, and with changing conditions, in a manner that is independent of the other orthogonal channels. For example, during the initial acquisition of the reverse link signal the power of the pilot channel may need to be increased to facilitate detection and synchronization at the base station. Once the reverse link signal is acquired, however, the necessary transmit power of the pilot channel would substantially decrease, and would vary depending on various factors including the subscriber units rate of movement. Accordingly, the value of the gain adjust factor $A_0$ would be increased during signal acquisition, and then reduced during an ongoing communication. In another example, when information more tolerable of error is being transmitted via the forward link, or the environment in which the forward link transmission is taking place is not prone to fade conditions, the gain adjust factor $A_1$ may be reduced as the need to transmit power control data with a low error rate decreases. In one embodiment of the invention, whenever power control adjustment is not necessary the gain adjust factor $A_1$ is reduced to zero.

In another embodiment of the invention, the ability to gain adjust each orthogonal channel or the entire reverse link signal is further exploited by allowing the base station 120 or other receive system to alter the gain adjust of a channel, or of the entire reverse link signal, via the use of power control commands transmitted via the forward link signal. In particular, the base station may transmit power control information requesting the transmit power of a particular channel or the entire reverse link signal be adjusted. This is advantageous in many instances including when two types of data having different sensitivity to error, such as digitized voice and digital data, are being transmitted via the BPSK and QPSK channels. In this case, the base station 120 would establish different target error rates for the two associated channels. If the actual error rate of a channel exceeded the target error rate, the base station would instruct the subscriber unit to reduce the gain adjust of that channel until the actual error rate reached the target error rate. This would eventually lead to the gain adjust factor of one channel being increased relative to the other. That is, the gain adjust factor associated with the more error sensitive data would be increased relative to the gain adjust factor associated with the less sensitive data. In other instances, the transmit power of the entire reverse link may require adjustment due to fade conditions or movement of the subscriber unit 100. In these instances, the base station 120 can do so via transmission of a single power control command.

Thus, by allowing the gain of the four orthogonal channels to be adjusted independently, as well as in conjunction with one another, the total transmit power of the reverse link signal can be kept at the minimum necessary for successful transmission of each data type, whether it is pilot data, power control data, signaling data, or different types of user data. Furthermore, successful transmission can be defined differently for each data type. Transmitting with the minimum amount of power necessary allows the greatest amount of data to be transmitted to the base station given the finite transmit power capability of a subscriber unit, and also reduces the interfere between subscriber units. This reduction in interference increases the total communication capacity of the entire CDMA wireless cellular system.

The power control channel used in the reverse link signal allows the subscriber unit to transmit power control information to the base station at a variety of rates including a rate of 800 power control bits per second. In the preferred embodiment of the invention, a power control bit instructs the base station to increase or decrease the transmit power of the forward link traffic channel being used to transmit information to the subscriber unit. While it is generally useful to have rapid power control within a CDMA system, it is especially useful in the context of higher data rate communications involving data transmission, because digital data is more sensitive to errors, and the high transmission causes substantial amounts of data to be lost during even brief fade conditions. Given that a high speed reverse link transmission is likely to be accompanied by a high speed forward link transmission, providing for the rapid transmission of power control over the reverse link further facilitates high speed communications within CDMA wireless telecommunications systems.

In an alternative exemplary embodiment of the invention a set of encoder input rates $E_R$ defined by the particular $N_R$ are used to transmit a particular type of data. That is, data may be transmitted at a maximum encoder input rate $E_R$ or at a set of lower encoder input rates $E_R$, with the associated $N_R$ adjusted accordingly. In the preferred implementation of this embodiment, the maximum rates corresponds to the maximum rates used in IS-95 compliant wireless communication system, referred to above with respect to Tables II and III as RS1-Full Rate and RS2-Full Rate, and each lower rate is approximately one half the next higher rate, creating a set of rates comprised of a full rate, a half rate, a quarter rate, and an eighth rate. The lower data rates are preferable generated by increasing the symbol repetition rate $N_R$ with value of $N_R$ for rate set one and rate set two in a BPSK channel provided in Table IV.

TABLE IV

RS1 and RS2 Rate Sets in BPSK Channel

| Label | $E_{R,QPSK}$ (bps) | Encoder Out R = ¼ (bits/frame) | $N_{R,R=¼}$ (Repetition Rate, R = ¼) | Encoder Out R = ½ (bits/frame) | $N_{R,R=½}$ (Repetition Rate, R = ½) |
|---|---|---|---|---|---|
| RS2-Full Rate | 14,400 | 1,152 | 5 1/3 | 576 | 10 2/3 |
| RS2-Half Rate | 7,200 | 576 | 10 ⅔ | 288 | 21 ⅓ |
| RS2-Quater Rate | 3,600 | 288 | 21 ⅓ | 144 | 42 ⅔ |
| RS2-Eigth Rate | 1,900 | 152 | 40 8/19 | 76 | 80 16/19 |
| RS1-Full Rate | 9,600 | 768 | 8 | 384 | 16 |
| RS1-Half Rate | 4,800 | 384 | 16 | 192 | 32 |
| RS1-Quater Rate | 2,800 | 224 | 27 3/7 | 112 | 54 6/7 |
| RS1-Eigth Rate | 1,600 | 128 | 48 | 64 | 96 |
| NULL | 850 | 68 | 90 6/17 | 34 | 180 12/17 |

The repetition rates for a QPSK channel is twice that for the BPSK channel.

In accordance with the exemplary embodiment of the invention, when the data rate of a frame changes with respect to the previous frame the transmit power of the frame is adjusted according to the change in transmission rate. That is, when a lower rate frame is transmitted after a higher rate frame, the transmit power of the transmit channel over which the frame is being transmitted is reduced for the lower rate frame in proportion to the reduction in rate, and vice versa. For example, if the transmit power of a channel during the transmission of a full rate frame is transmit power T, the transmit power during the subsequent transmission of a half rate frame is transmit power T/2. The reduction is transmit power is preferably performed by reducing the transmit power for the entire duration of the frame, but may also be performed by reducing the transmit duty cycle such that some redundant information is "blanked out." In either case, the transmit power adjustment takes place in combination with a closed loop power control mechanism whereby the transmit power is further adjusted in response to power control data transmitted from the base station.

Figure 5:
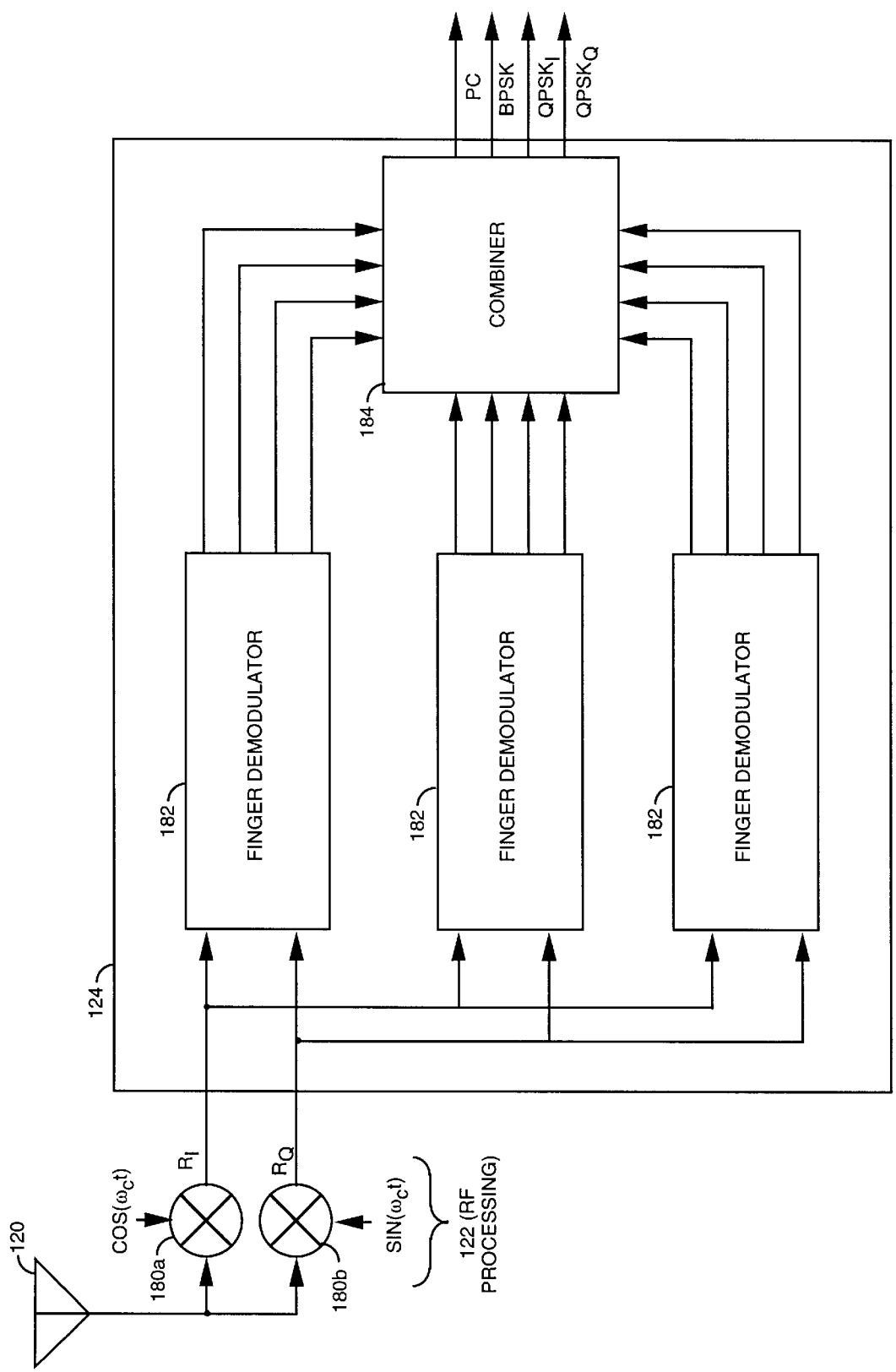
FIG. 5 is a block diagram of a receive processing system configured in accordance with the exemplary embodiment of the invention.

FIG. 5 is a block diagram of RF processing system 122 and demodulator 124 of FIG. 2 configured in accordance with the exemplary embodiment of the invention. Multipliers 180a and 180b downconvert the signals received from antenna 121 with an in-phase sinusoid and a quadrature phase sinusoid producing in-phase receive samples $R_I$ and quadrature-phase receive samples $R_Q$ receptively. It should be understood that RF processing system 122 is shown in a highly simplified form, and that the signals are also match filtered and digitized (not shown) in accordance with widely known techniques. Receive samples $R_I$ and $R_Q$ are then applied to finger demodulators 182 within demodulator 124. Each finger demodulator 182 processes an instance of the reverse link signal transmitted by subscriber unit 100, if such an instance is available, where each instance of the reverse link signal is generated via multipath phenomenon. While three finger demodulators are shown, the use of alternative numbers of finger processors are consistent with the invention including the use of a single finger demodulator 182. Each finger demodulator 182 produces a set of soft decision data comprised of power control data, BPSK data, and $QPSK_I$ data and $QPSK_Q$ data. Each set of soft decision data is also time adjusted within the corresponding finger demodulator 182, although time adjustment could be performed within combiner 184 in an alternative embodiment of the invention. Combiner 184 then sums the sets of soft decision data received from finger demodulators 182 to yield a single instance of power control, BPSK, $QPSK_I$ and $QPSK_Q$ soft decision data.

Figure 6:
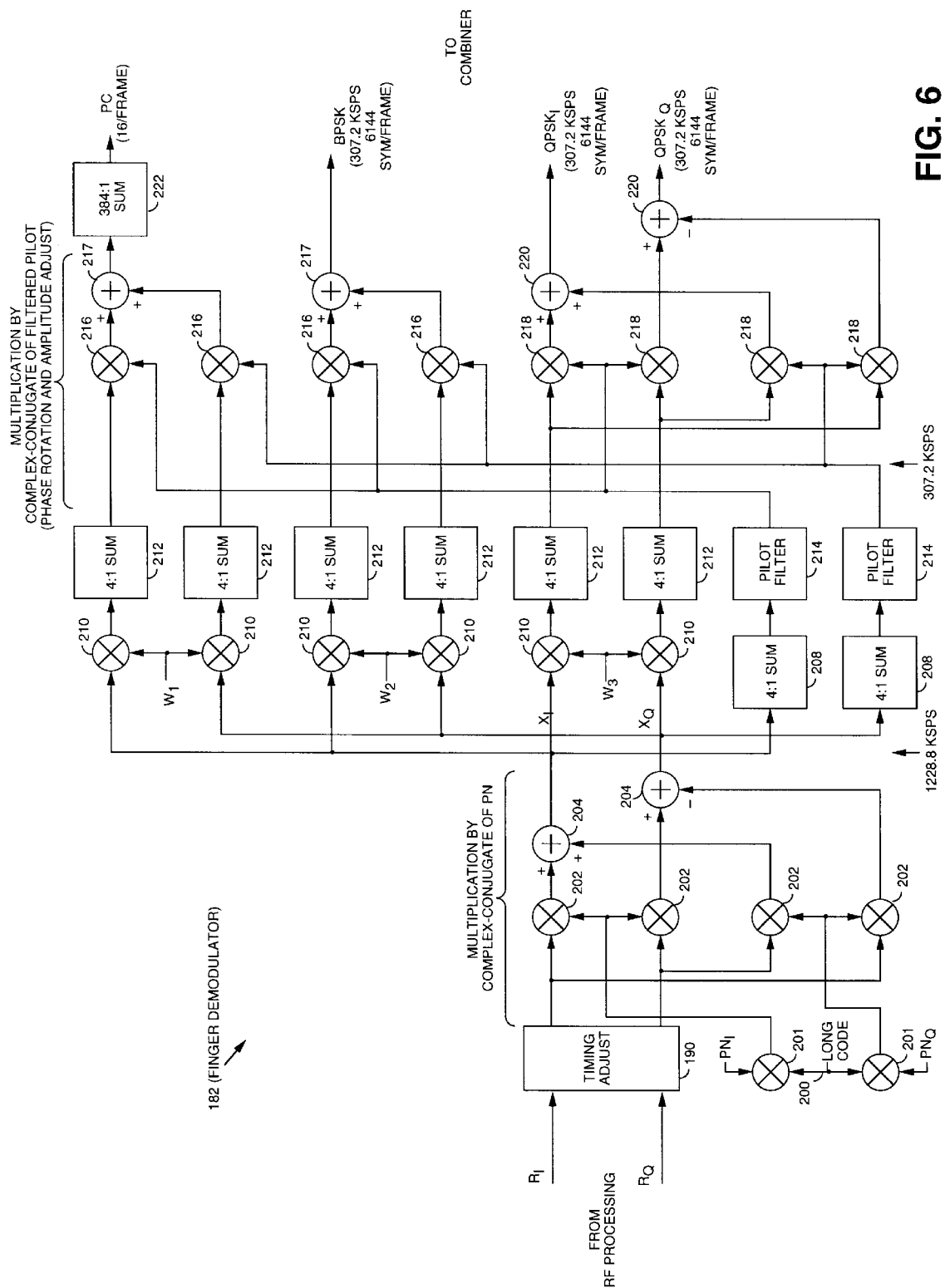
FIG. 6 is a block diagram of a finger processing system configured in accordance with one embodiment of the invention.

FIG. 6 is block diagram a finger demodulator 182 of FIG. 5 configured in accordance with the exemplary embodiment of the invention. The $R_I$ and $R_Q$ receive samples are first time adjusted using time adjust 190 in accordance with the amount of delay introduced by the transmission path of the particular instance of the reverse link signal being processed. Long code 200 is mixed with pseudorandom spreading codes $PN_I$ and $PN_Q$ using multipliers 201, and the complex conjugate of the resulting long code modulated $PN_I$ and $PN_Q$ spreading codes are complex multiplied with the time adjusted $R_I$ and $R_Q$ receive samples using multipliers 202 and summers 204 yielding terms $X_I$ and $X_Q$. Three separate instances of the $X_I$ and $X_Q$ terms are then demodulated using the Walsh codes $W_1$, $W_2$ and $W_3$ respectively, and the resulting Walsh demodulated data is summed over four demodulation chips using 4 to 1 summers 212. A fourth instance of the $X_I$ and $X_Q$ data is summed over four demodulation chips using summers 208, and then filtered using pilot filters 214. In the preferred embodiment of the invention pilot filter 214 performs averaging over a series of summations performed by summers 208, but other filtering techniques will be apparent to one skilled in the art. The filtered in-phase and quadrature-phase pilot signals are used to phase rotate and scale the $W_1$, and $W_2$ Walsh code demodulated data in accordance with BPSK modulated data via complex conjugate multiplication using multipliers 216 and adders 217 yielding soft decision power control and BPSK data. The $W_3$ Walsh code modulated data is phase rotated using the in-phase and quadrature-phase filtered pilot signals in accordance with QPSK modulated data using multipliers 218 and adders 220, yielding soft decision QPSK data. The soft decision power control data is summed over 384 modulation symbols by 384 to 1 summer 222 yielding power control soft decision data. The phase rotated $W_2$ Walsh code modulated data, the $W_3$ Walsh code modulated data, and the power control soft decision data are then made available for combining. In an alternative embodiment of the invention, encoding and decoding is performed on the power control data as well.

In addition to providing phase information the pilot may also be used within the receive system to facilitate time tracking. Time tracking is performed by also processing the received data at one sample time before (early), and one sample time after (late), the present receive sample being processed. To determine the time that most closely matches the actual arrival time, the amplitude of the pilot channel at the early and late sample time can be compared with the amplitude at the present sample time to determine that which is greatest. If the signal at one of the adjacent sample times is greater than that at the present sample time, the timing can be adjusted so that the best demodulation results are obtained.

Figure 7:
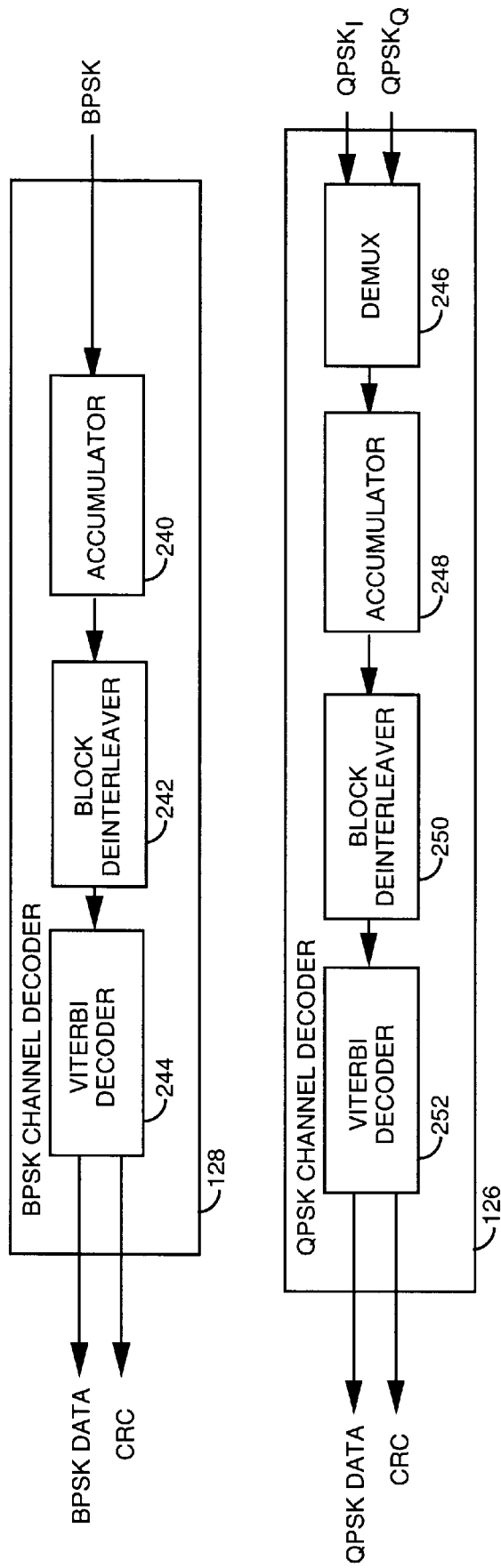
FIG. 7 is a block diagram of a BPSK channel decoder and a QPSK channel decoder configured in accordance with the exemplary embodiment of the invention.

FIG. 7 is a block diagram of BPSK channel decoder 128 and QPSK channel decoder 126 (FIG. 2) configured in accordance with the exemplary embodiment of the invention. BPSK soft decision data from combiner 184 (FIG. 5) is received by accumulator 240 which stores the first sequence of $6{,}144/N_R$ demodulation symbols in the received frame where $N_R$ depends on the transmission rate of the BPSK soft decision data as described above, and adds each subsequent set of $6{,}144/N_R$ demodulated symbols contained in the frame with the corresponding stored accumulated symbols. Block deinterleaver 242 deinterleaves the accumulated soft decision data from variable starting point summer 240, and Viterbi decoder 244 decodes the deinterleaved soft decision data to produce hard decision data as well as CRC check sum results. Within QPSK decoder 126 $QPSK_I$ and $QPSK_Q$ soft decision data from combiner 184 (FIG. 5) are demultiplexed into a single soft decision data stream by demux 246 and the single soft decision data stream is received by accumulator 248 which accumulates every $6{,}144/N_R$ demodulation symbols where $N_R$ depends on the transmission rate of the QPSK data. Block deinterleaver 250 deinterleaves the soft decision data from variable starting point summer 248, and Viterbi decoder 252 decodes the deinterleaved modulation symbols to produce hard decision data as well as CRC check sum results. In the alternative exemplary embodiment described above with respect to FIG. 3 in which symbol repetition is performed before interleaving, accumulators 240 and 248 are placed after block deinterleavers 242 and 250. In the embodiment of the invention incorporating the use of rate sets, and therefore in which the rate of particular frame is not known, multiple decoders are employed, each operating at a different transmission rate, and then the frame associated with the transmission rate most likely to have been used is selected based on the CRC checksum results. The use of other error checking methods is consistent with the practice of the present invention.

Figure 8:
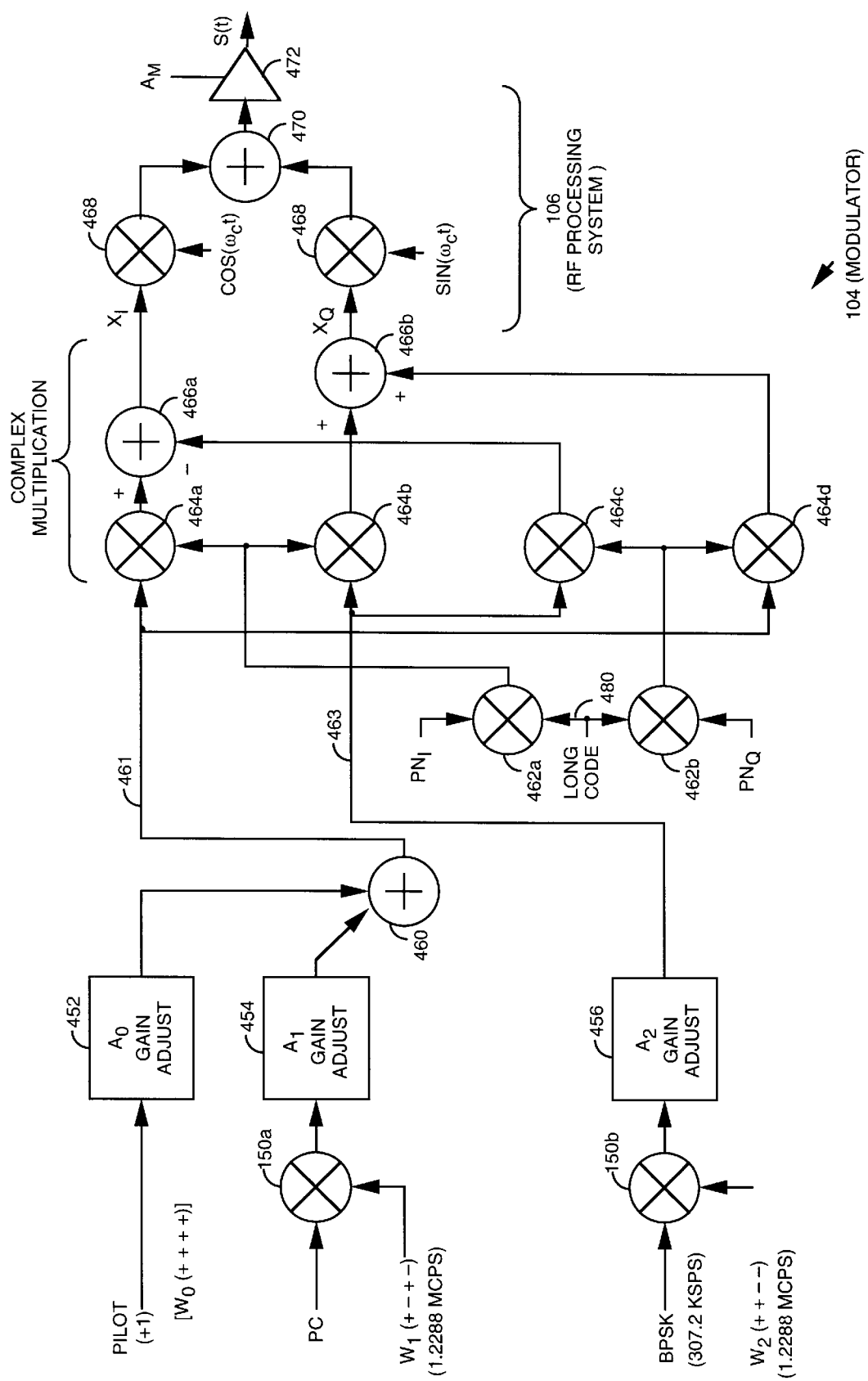
FIG. 8 is a block diagram of a transmit signal processing system configured in accordance with a second exemplary embodiment of the invention.

FIG. 8 is a block diagram of modulator 104 (FIG. 2) configured in an alternative embodiment of the invention in which a single BPSK data channel is employed. Pilot data is gain adjusted by gain adjust 452 in accordance with gain adjust factor $A_0$. Power control data is modulated with Walsh code $W_1$ by multiplier 150a and gain adjusted by gain adjust 454 in accordance with gain adjust factor $A_1$. The gain adjusted pilot data and power control data are summed by summer 460 producing summed data 461. BPSK data is modulated with Walsh code $W_2$ by multiplier 150b and then gain adjusted using gain adjust 456 in accordance with gain adjust factor $A_2$.

In-phase pseudo random spreading code ($PN_I$) and quadrature-phase pseudo random spreading code ($PN_Q$) are both modulated with long code 480. The resulting long code modulated $PN_I$ and $PN_Q$ codes are complex multiplied with the summed data 461 and the gain adjusted BPSK data from gain adjust 456 using multipliers 464a–d and summers 466a–b yielding terms $X_I$ and $X_Q$. Terms $X_I$ and $X_Q$ are then upconverted with in-phase and quadrature-phase sinusoids using multipliers 468 and the resulting upconverted signals are summed by summers 470 respectively, and amplified by amplifier 472 in accordance with amplitude factor $A_M$ generating signal s(t).

The embodiment shown in FIG. 8 differs from the other embodiments described herein in that the BPSK data is placed in the quadrature-phase channel while the pilot data and power control data are placed in the in-phase channel. In the other embodiments of the invention described herein the BPSK data is placed the in-phase channel along with the pilot data and power control data. Placing the BPSK data in the quadrature-phase channel and the pilot and power control data in the in-phase channel reduces the peak-to-average power ratio of the reverse link signal the phases of the channels are orthogonal causing the magnitude of the sum of the two channels to vary less in response to changing data. This reduces the peak power required to maintain a given average power, and thus reduces the peak-to-average power ratio characteristic of the reverse link signal. This reduction in the peak-to-average power ratio decreases the peak power at which a reverse link signal must be received at the base station in order to sustain a given transmission rate, and therefore increases the distance a subscriber unit having a maximum transmit power may be located from the base station before it is unable to transmit a signal that can received at base station with the necessary peak power. This increase in the distance a subscriber unit may be located from the base station while still being able to transmit a signal that is received with the necessary peak power increases the range at which the subscriber unit is able to successfully conduct communication at any given data rate.

FIG. 9 is a block diagram of finger demodulator 182 when configured in accordance with the embodiment of the invention shown in FIG. 8. Receive samples $R_I$ and $R_Q$ are time adjusted by timing adjust 290 and the $PN_I$ and $PN_Q$ codes are multiplied by long code 200 using multipliers 301. The time adjusted receive samples are then multiplied by the complex conjugate of the $PN_I$ and $PN_Q$ codes using multipliers 302 and summers 304 yielding terms $X_I$ and $X_Q$. A first and second instance of the $X_I$ and $X_Q$ terms are demodulated using Walsh code $W_1$ and Walsh code $W_2$ using multipliers 310 and the resulting demodulation symbols are summed in sets of four using summers 312. A third instance of the $X_I$ and $X_Q$ terms are summed over four demodulation symbols by summers 308 to generate pilot reference data. The pilot reference data is filtered by pilot filters 314 and used to phase rotate and scale the summed Walsh code modulated data using multipliers 316 and adders 320 producing BPSK soft decision data, and after being summed over 384 symbols by 384:1 summer 322, soft decision power control data.

Thus, a multi-channel, high rate, CDMA wireless communication system has been described. The description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for generating modulated data for transmission from a first subscriber unit in a set of subscriber units to a base station in communication with the set of subscriber units comprising the steps of:
   a) modulating first data with a first orthogonal code to generate first channel data;
   b) modulating second data with a second orthogonal modulation code to produce second channel data;
   c) modulating said first channel data with an in-phase spreading code and a quadrature-phase spreading code to generate first in-phase spread data and first quadrature-phase spread data;
   d) modulating said second channel data with said in-phase spreading code and said quadrature-phase spreading code to generate second in-phase spread data and second quadrature-phase spread data;

e) subtracting said second quadrature-phase spread data from said first in-phase spread data yielding an in-phase term; and f) adding said second in-phase spread data with said first quadrature-phase spread data yielding a quadrature-phase term.

2. The method as set forth in claim 1 further comprising the steps of:

gain adjusting said first channel data; and gain adjusting said second channel data.

3. The method as set forth in claim 1 wherein:

said first data is pilot data; and said second data is user data.

4. The method as set forth in claim 1 further comprising the steps of:

modulating third channel data with a third Walsh code;

adding said third channel data into said first channel data, wherein said first channel data is pilot data, and said second channel data is power control data.

* * * * *

UNITED STATES PATENT AND TRADEMARK OFFICE
CERTIFICATE OF CORRECTION

PATENT NO.    : 5,926,500
DATED         : July 20, 1999
INVENTOR(S)   : Joseph P. Odenwalder It is certified that error appears in the above-identified patent and that said Letters Patent is hereby corrected as shown below:

Column 5,
Line 57, delete "154d" and insert -- 150d --.

Column 13,
Line 12, delete "variable starting point summer" and insert -- accumulator --.
Lines 22-23, delete "variable starting point summer" and insert -- accumulator --.

Signed and Sealed this

Ninth Day of July, 2002

Attest:

JAMES E. ROGAN
Attesting Officer — Director of the United States Patent and Trademark Office

UNITED STATES PATENT AND TRADEMARK OFFICE
CERTIFICATE OF CORRECTION

PATENT NO. : 5,926,500
DATED : July 20, 1999
INVENTOR(S) : Joseph P. Odenwalder

It is certified that error appears in the above-identified patent and that said Letters Patent is hereby corrected as shown below:

Title page,
Item [63], Related U.S. Application Data Information, please insert the following information:

-- [63] This application is a continuation-in-part of application serial no. 08/654,443, now U.S. Patent No. 5,930,230, entitle "High Data Rate CDMA Wireless Communication System" filed May 28, 1996 and assigned to the assignee of the present invention. --

Signed and Sealed this

Twenty-fourth Day of June, 2003

JAMES E. ROGAN
*Director of the United States Patent and Trademark Office*